(12) United States Patent
Hertzog et al.

(10) Patent No.: US 9,637,286 B2
(45) Date of Patent: May 2, 2017

(54) AGRICULTURAL TANK CHEMICAL MEASURING SYSTEM

(71) Applicants: James N Hertzog, Butler, MO (US); George W Steinmeir, Kansas City, MO (US)

(72) Inventors: James N Hertzog, Butler, MO (US); George W Steinmeir, Kansas City, MO (US)

( * ) Notice: Subject to any disclaimer, the term of this patent is extended or adjusted under 35 U.S.C. 154(b) by 76 days.

(21) Appl. No.: 14/667,532

(22) Filed: Mar. 24, 2015

(65) Prior Publication Data

US 2015/0266597 A1    Sep. 24, 2015

Related U.S. Application Data

(60) Provisional application No. 61/969,674, filed on Mar. 24, 2014, provisional application No. 61/971,568, filed on Mar. 28, 2014, provisional application No. 62/124,184, filed on Dec. 12, 2014.

(51) Int. Cl.
*B65B 3/04* (2006.01)
*B65D 51/16* (2006.01)
*B65D 41/56* (2006.01)
*B65D 47/08* (2006.01)

(52) U.S. Cl.
CPC ......... *B65D 51/1683* (2013.01); *B65D 41/56* (2013.01); *B65D 47/0895* (2013.01)

(58) Field of Classification Search
CPC ...... B65B 3/04; B65D 41/56; B65D 47/0895; B65D 51/1683
USPC ................................. 141/112, 338, 340, 382
See application file for complete search history.

(56) References Cited

U.S. PATENT DOCUMENTS

| 4,993,606 A | * | 2/1991 | Bolen, Jr. | .......... B65D 47/0885 215/235 |
| 6,263,923 B1 | * | 7/2001 | Castillo | .................. B65D 51/28 141/100 |
| 2007/0113920 A1 | * | 5/2007 | Bronner | ................. B65D 41/26 141/112 |

\* cited by examiner

*Primary Examiner* — Timothy L Maust
*Assistant Examiner* — Andrew Schmid
(74) *Attorney, Agent, or Firm* — Arthur K. Shaffer; Intellectual Property Center, LLC (57) ABSTRACT

The present invention provides a system for receiving and dispensing additives into an agricultural tank have a threaded opening, the system including a threadable cap releasably secured to a measuring device and threaded to the tank threaded opening, the threadable cap including a hose restrictor for passing a hose through said threadable cap into said tank.

4 Claims, 6 Drawing Sheets

AGRICULTURAL TANK CHEMICAL MEASURING SYSTEM

CROSS-REFERENCE TO RELATED APPLICATION

The present application claims the benefit of the prior filed U.S. provisional patent application Nos. 61/969,674, 61/971,568 and 62/124,184 filed on Mar. 24, 2014, Mar. 28, 2014 and Jan. 9, 2015 respectively, the contents of which are incorporated herein by reference.

FIELD OF THE INVENTION

The present invention is broadly directed to improvements in agricultural mixing tanks and, more particularly, to an improved agriculture chemical measuring and mixing tank for mixing and diluting chemicals in the field to provide a spray mixture.

BACKGROUND OF THE INVENTION

Agricultural chemicals are problematic to people and the environment in that they produce harmful effects on people and the debris left behind can be harmful to the environment. Many of these chemicals are extremely toxic in their concentrated liquid form and to the extent these chemicals produce fumes, these fumes can also be dangerous if inhaled or if any contact is made by the worker with these toxins such as on its skin, in their eyes or other exposed areas of their body.

Typically, in an agricultural setting, the agricultural worker is provided a truck mounted tank with a hose for adding liquid, a tank sprayer for dispersing the liquid and a quantity of chemicals to be added to the tank. These tanks can vary from a few gallons to several hundred. Often, the chemicals are added directly from a chemical container, and these chemicals can be powder or liquid and may spill or splatter out of the chemical container onto or into the tank or the chemical container. In many cases, the chemicals must be diluted for use with the tank which can vary in size. Thus, depending on the size of the tank, a varying amount of chemicals may be required. If the worker uses excessive chemicals, the crop or livestock may be damaged or destroyed. Too little, may result in an ineffective treatment of the crops or livestock, which also may result in damage or destruction to the crops or livestock. With most conventional systems, the loading and mixing of the chemicals is performed manually by the worker using open top containers and must be done each time the chemical is applied and in some cases, may need to be done repeatedly during the application process. These chemicals are dangerous. Even if the worker is extremely carful, follows all of the prescribed safety precautions and wears the necessary protective clothing, the hazards involved in measuring and transferring the chemicals to the tank is unfortunately too common. Many workers spill, inhale or otherwise become injured from using these harmful chemicals.

One concern is the safety of the workers who handle the container after it is exposed to the caustic chemicals and the environmental concerns associated with storing and disposing of the chemical containers when not in use and to prevent contamination to children, animals and land. Another concern is the lack of accuracy in dispensing the chemicals which may lead to damage of crops and increased cost associated with excess chemicals being dispensed. It thus would be desirable to provide an accurate tank chemical measuring device which saves both time and money.

In treating the fields and crops, the applicable chemicals are sold in a concentrated or condensed form and must be diluted to a specific ratio. Thus to ensure proper application, the worker is required to measure a specific quantify of the product prior to adding it to the tank for spraying in order to ensure a proper mix. However, many chemicals do not come with a measuring device or if they do, it may be unsatisfactory for a number or reasons including that the device may have become damaged or lost. If a measuring cup is available, it may be unreliable, inaccurate, dirty or damaged from rolling around in the back of a truck. Some chemicals containers have graduations or indicia on the edges; however, these too are often unreadable or unreliable. Often times, the worker must guess as to the correct quantity of the chemical to be added to the tank. In some cases, the user has a measuring cup which they can use, but the measuring cup more often than not is lost, dirty or unusable. In other cases, a measuring cup is not provided or is provided in such a way that it is inconvenient to carry in the back of the truck without becoming lost, dirty or unusable. Without a useable, accurate measuring cup, proper dilution or usage of the chemical is difficult if not impossible.

Another problem is the ability to connect a hose to the tank after or during the addition of the chemical additive. Filing the tank with a common garden hose may cause the hose to become contaminated by the chemical additive potentially causing harm to later users such as children or pets who may drink or come into contact with the contaminated hose. Another problem is that it is inconvenient to hold the hose in position while filling a tank, which may take several minutes. It therefore would be beneficial to provide a hose restrictor which conveniently maintains the position of the hose during the filling process while avoiding unnecessary chemical contamination. Therefore, a need exists for a convenient, portable measuring cup for use with agricultural chemicals for help in measuring the proper amount of chemicals for dilution within the tank.

SUMMARY OF THE INVENTION

The present invention is an improved system for use with a conventional fluid tank having a threaded opening or any other standard opening and comprising a threaded cap having a cap sidewall extending between a cap base and a cap lip, said cap sidewall presenting a threaded member for threaded engagement with the agricultural tank as said cap lip is extensing towards said agricultural tank, said threaded cap at least partially received by the threaded opening, a hose restrictor mounted to said cap base and pivotable from a closed position to an open position for passage of a hose through said base of said threadable cap for filling the agricultural tank with fluid from said hose and said threadable cap having a retainer engagement ring and a hose restrictor having a cap engagement ring whereby said retainer engagement ring and said cap engagement ring are engaged while said hose restrictor is in said closed position.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
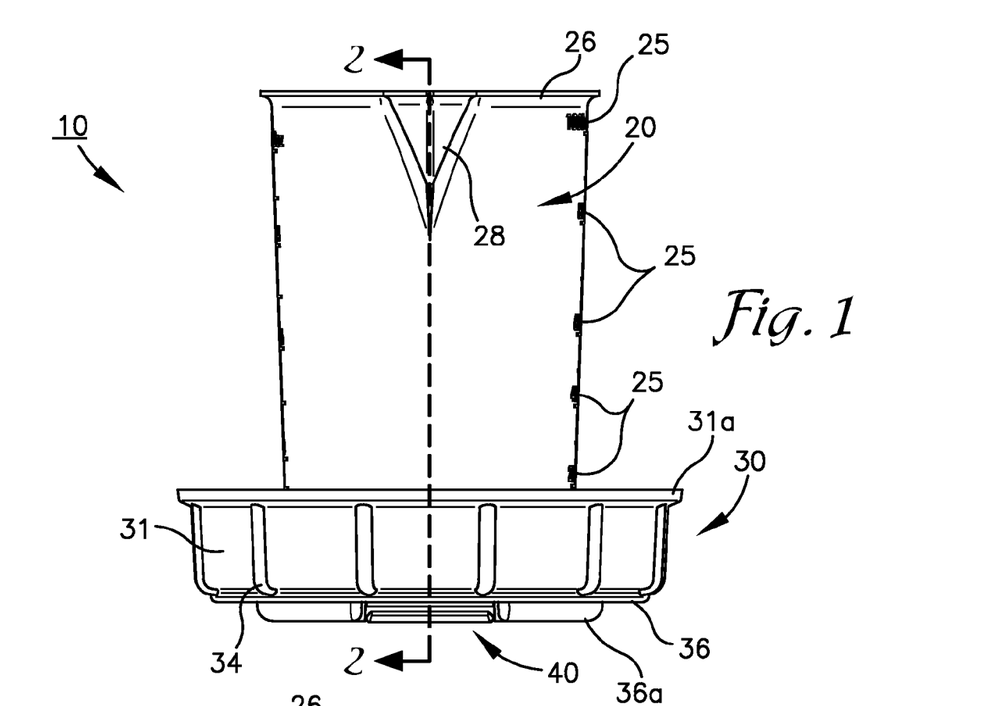
FIG. 1 is a front elevation of the system.

Referring to the drawings in more detail, the reference numeral 10 generally refers to an embodiment of the system 10 including a measuring device 20 being removeably secured to a threadable cap 30 generally designed for use with a common agricultural fluid tank (not shown) by a hanger 29. The measuring device 20 depicted in FIGS. 1-2 generally includes a generally cylindrical sidewall 24 extending from a generally circular bottom 22 towards a circular lip 26, with a triangular spout 28 extending outwardly from the cylindrical sidewall 24. A plurality of sidewall measuring indicia 25 are spaced along the cylindrical sidewall 24 for assistance in measuring various additives for example, but not limited to agricultural liquids such as DCPA, dalapon plus dicamba, TCA, picloram and MSMA which may be measured and poured into the tank (not shown) for spraying on various animals, crops or lawns as desired. The measuring device 20 being generally known may have alternative configurations which meet the needs described herein or as later comes within the scope of the present invention described herein.

The threadable cap 30 has a generally circular base 36 and a cap sidewall 31 extending from the base 36 towards a cap lip 31a and as illustrated includes a plurality of ribbed members 34 spaced along the cap sidewall 31, although the threadable cap 30 is not limited to the illustrated depiction. As further illustrated in FIG. 2, the threadable cap 30 includes at least one threaded member 30a. Generally, the threadable cap 30 has sufficient size and dimensions for threadable receipt by a standard agricultural tank (not shown) so that the cap 30 is releasably secured to the opening of the tank with the measuring device 20 positioned in a downward orientation, dispensing any measured fluids into the tank (not shown). By way of example, common fluid holding tanks includes those described in issued U.S. Pat. Nos. 1,316,949; 5,180,190; 5,285,923; 5,365,980; 5,534,318; 5,383,566; 6,189,723; 6,772,702; 7,083,065; 7,168,443; and 8,960,484 the disclosures of which are incorporated herein by reference as it relates to the fluid holding tanks in general suitable for use in connection with the present invention.

One embodiment of the various tanks illustrated in the referenced U.S. patents above includes in a common agricultural spray tank operation where the tank is used for spraying fluids on crops and agriculture products and includes a substantial hollow body with a cylindrical threaded opening, commonly having a 5-inch diameter threaded opening for which the threadable cap 30 is adapted for receipt. The tank (not shown) generally has conventional construction and includes a central portion connecting to two opposing ends with supporting sidewall construction which is generally adapted for supporting and receiving a fluid for transport to a field or lawn for treating vegetation or livestock. As is generally known, the tank measuring device 20, threadable cap 30 and hose restrictor 40 may be fabricated from a chemically non-reactive material suitable for general use on vegetation and livestock.

Figure 2:
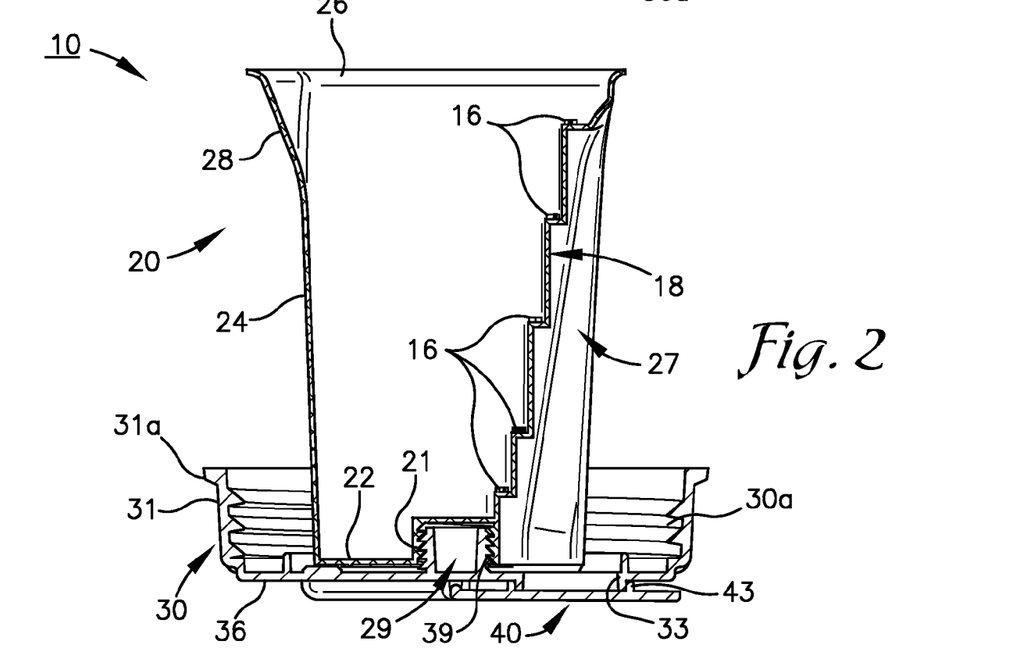
FIG. 2 is a cross-section of the system taken along line 2-2 in FIG. 1.

As further illustrated in FIG. 2, a plurality of raised measurement indicia 16 are located on an integrally formed stepped structure 18 also referred to herein as the stepped measurement structure. Generally, the raised measurement indicia 16 correspond to the sidewall measuring indicia 25 which are located on the cylindrical sidewall 24. However, the stepped structure 18 in FIG. 2 is depicted with both vertical spacing up the cylindrical sidewall and radially outward from the center thereof. This allows a user to readily determine the measurement of any contained tank additives both vertically and radially between the plural raised measurement indicia 16 while looking down into the measuring device 20. In addition, the stepped structure 18 connectably extends along the cylindrical sidewall 24, the measuring device 20 being suitable for containing fluids within the interior presented thereby. A generally arcuate passage 27 extends rearwardly from the stepped structure 18 and outwardly from the cylindrical sidewall 24.

The sidewall measuring indicia 25 and raised measurement indicia 16 may each represent a volume, a ratio, a number, or some other volumetric reference which is used in measuring, diluting and/or adding the additive to the tank (not shown) for spraying upon the desired vegetation and/or livestock and may be redundant or supplemental to each other for use in measuring the additive. The system 10 is generally oriented in the operational configuration (exploded for clarity) in FIG. 8, the measuring device 20 generally oriented with the sidewall and raised measurement indicia 25, 16 being displayed upwardly from the threadable cap 30. The system 10 is generally oriented in the stored configuration (exploded for clarity) in FIG. 9 which while in an stored configuration the measuring device 20 is generally adapted for threaded receipt within a threaded tank opening associated with the tank (not shown). The threadable cap 30 may alternatively include additional circular contours extending circumferentially along the outer cap sidewall 31.

The sidewall measuring indicia 25 may include a centrally positioned reference system with plural measuring indicia associated with an offset, narrowing cylindrical structure with various volumetric markings being located centrally along the sidewall 24 of the measuring device 20. The raised or beveled measurement indicia 16 may be spaced along the stepped structure 18 or alternatively along cylindrical or bossed surfaces (not shown) which extend upwardly along the interior of the measuring device 20 to indicate the volume of the additive being measured for distribution into the tank (not shown) for dispensing therein.

A releasable connection between the measuring device and threadable cap is depicted in FIG. 2 with a hanger 29 including a male portion of a threaded fastener 39 extending upwardly from the threadable cap 30 for threaded receipt by a female portion referred to herein as a cap receiver 21 associated with the measuring device 20. The threaded fastener 39 and cap receiver 21 presenting a releasable mechanical connection jointly referred to as the hanger 29. Although FIG. 2 illustrates the hanger 29 with the male threaded fastener 39 engaged to the female threaded cap receiver 21, various alternative configurations may be utilized for releasably connecting the measuring device 20 to the threadable cap 30 for use in the operational and storage configurations further described herein.

FIG. 2 depicts the arcuate passage 27 angularly oriented and extending upwardly from the threadable cap 30 behind the stepped structure 18. As further illustrated in FIGS. 6-7, the arcuate passage 27 is configured for securely receiving and guiding a typical garden hose 8 inserted through the threadable cap 30 towards the tank (not shown), while the system 10 is secured thereto.

Figure 3:
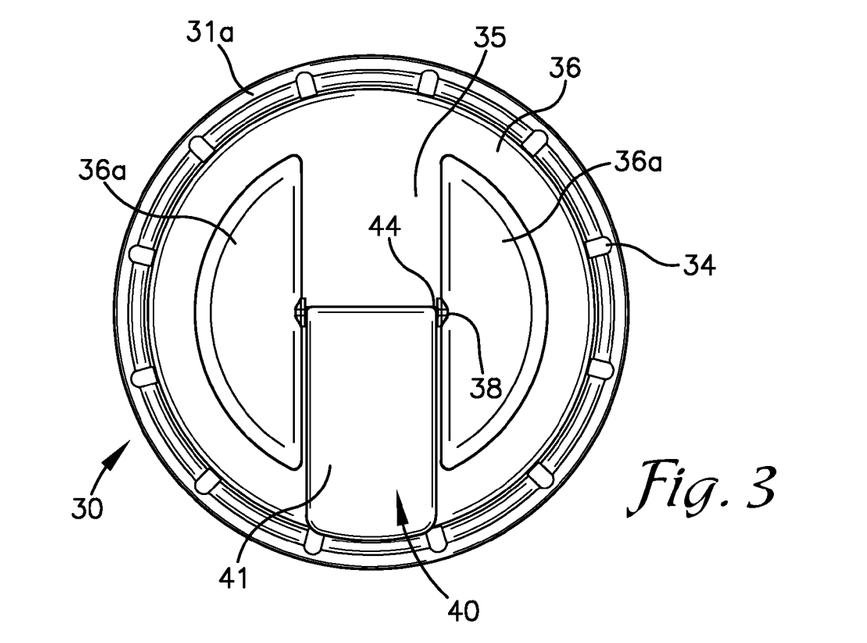
FIG. 3 is a top plan view of a hose restrictor mounted to a threadable cap, the hose restrictor in the closed position.
Figure 5:
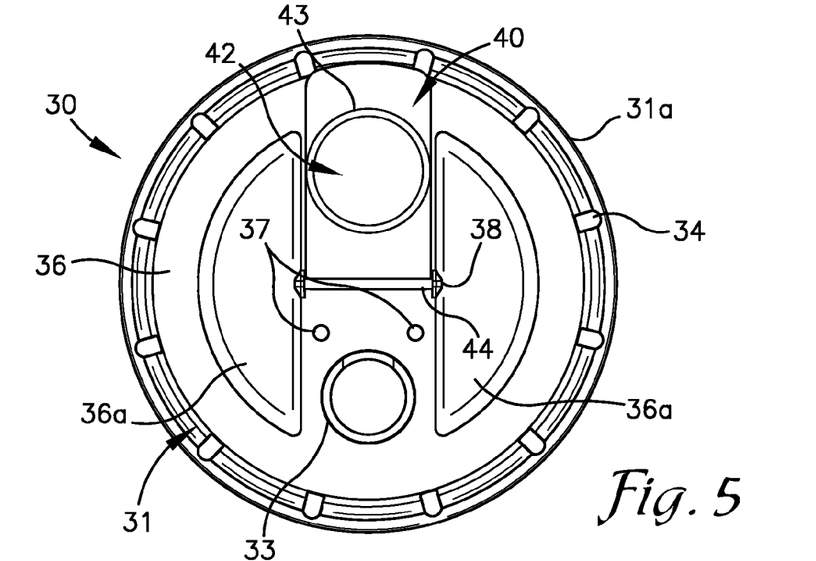
FIG. 5 is a top plan view of the hose restrictor mounted to the threadable cap of
FIG. 3, the hose restrictor in the open position.

FIG. 3 illustrates the base 36 of the threadable cap 30 with the pivotable hose restrictor 40 positioned along a central channel 35 bisecting a generally raised region of the base 36 presenting a pair of mirrored Ds 36a each extending outwardly from the central channel 35. The hose restrictor 40 includes a hinge member such as a pivotable hinge pin 44 for pivoted operation of the hose restrictor 40 between the open and closed position. The hose restrictor 40 rotates within the central channel 35 about a pair of hinge receivers 38 which are illustrated as being positioned along the outwardly extending raised Ds 36a. The hinge receivers 38 are generally configured for receiving the hinge member 44 during pivoted rotation of the hose restrictor 40 as it moves from the closed position to the open position. In the embodiment of the threadable cap illustrated in FIG. 5, a pair of venting apertures 37 are illustrated along the central channel 35 with the hose restrictor 40 in the open position. The venting apertures 37 may allow for the flow of air through the threadable cap 30 while threadably secured to the tank (not shown) as it is filled by the hose 8.

An alternative embodiment of the invention is shown with the hose restrictor 40 and the threadable cap 30, the hose restrictor 40 being mounted to the threadable cap 30 and being pivotable from a closed position to an open position for passage of the hose 8 through the cap base 36 for filling the tank (not shown) with fluid presented by the hose 8. The hose restrictor 40 includes a top surface 41 and a lower surface 42, the top surface 41 being substantially planar while the lower surface 42 includes a cap engagement ring 43 generally of sufficient size and dimension for being releasably secured to a retainer engagement ring 33 while the hose restrictor 40 is in the closed position. In the open position of the hose restrictor 40, the retainer engagement ring 33 has sufficient size and shape and is generally aligned with the arcuate passage 27 for receiving the hose 8 therethrough as desired.

Figure 7:
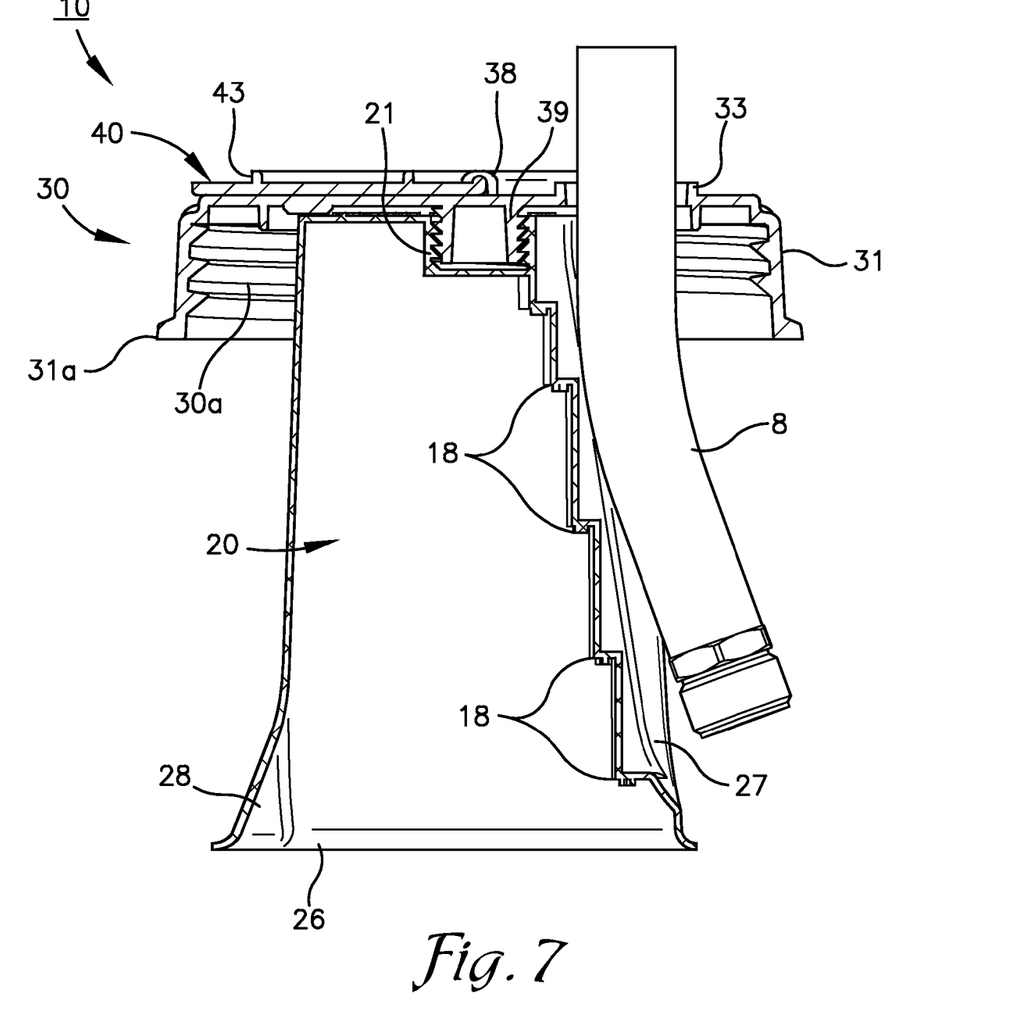
FIG. 7 is a cross-section taken along line 7-7 in FIG. 6.

As depicted in FIG. 2, the hose restrictor 40 is in the closed position while the cap engagement ring 43 extends upwardly from the lower surface 42 and the retainer engagement ring 33 extends downwardly from the central channel 35 for engagement thereat. In the closed position the hose restrictor 40 is rotated forward and the cap engagement ring 43 is positioned for direct engagement with the retainer engagement ring 33. In this position, the top surface 41 is generally coplanar with the pair of raised double Ds 36a. In the open position, as illustrated in FIG. 7, the hose restrictor 40 is pivoted rearwardly with the retainer engagement ring 33 ready for receipt of the hose 8 therethrough. Other configurations may be utilized as desired for releasably connecting the hose restrictor 40 to the threadable cap 30.

Figure 4:
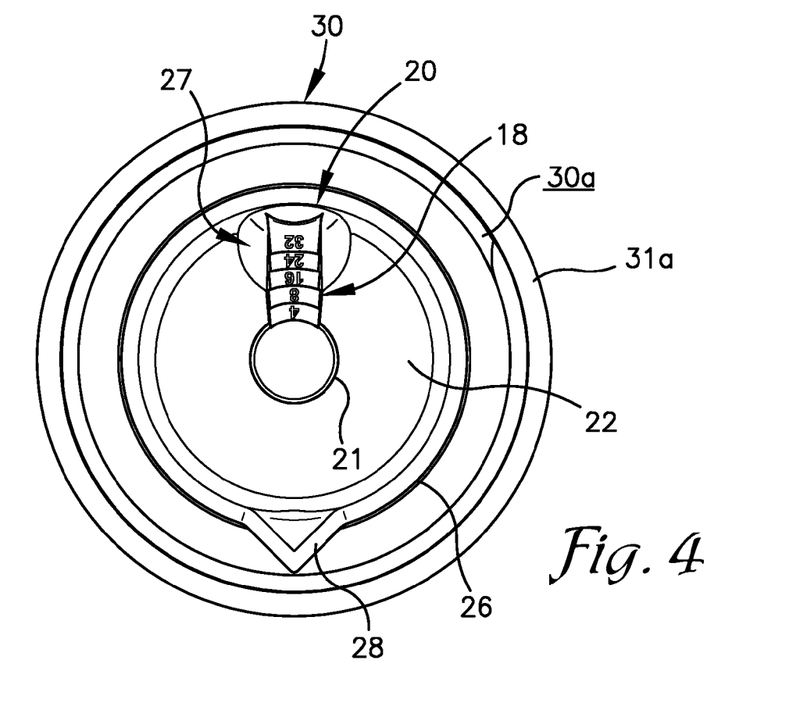
FIG. 4 is a top plan view of the threadable cap in receipt of the measuring device.

FIG. 4 illustrates the measuring device 20 with the stepped structure 18 extending radially from the centrally located cap receiver 21 to the cylindrical sidewall 24 with the arcuate passage 27 extending rearwardly therefrom. The dispensing spout 28 also extends outwardly for easy dispensing of any contained additives into the tank (not shown) as desired.

Figure 6:
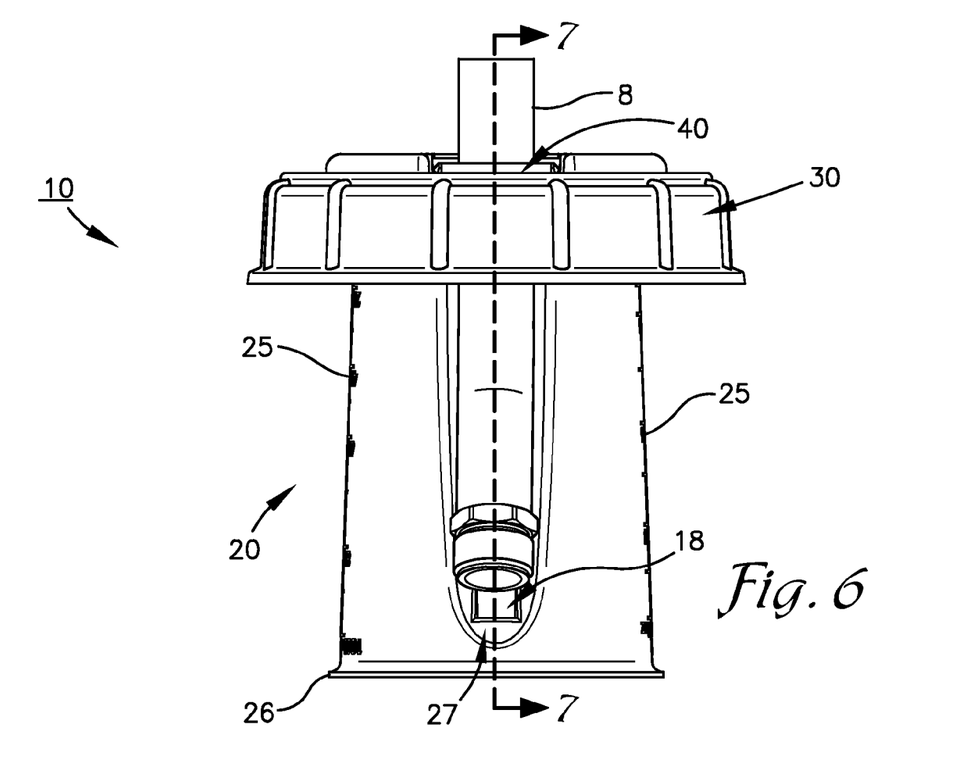
FIG. 6 is a rear elevation of the system.

FIGS. 6-7 illustrates the hose 8 in association with the system 10 with the hose 8 passed through the threadable cap 30 into the arcuate passage 27 and extending rearwardly from the measuring device 20 for fluidic communication with the tank (not shown) when the threadable cap 30 is threadably secured to the tank (not shown). In the depicted embodiment, the hose restrictor 40 is pivoted backwardly towards the open position with the cap engagement ring 43 extending upward and the arcuate passage 27 adapted for and in receipt of the hose 8 through the retainer engagement ring 33 into a hose aperture 33a. the hose aperture 33a is encircled by and presented by the retainer engagement ring 33 and preferably has sufficient size and dimensions for passage of a standard garden hose therethrough for receipt by the arcuate passage 27. Thread 30a extending along the interior of the threadable cap 30 is generally adapted for releasably securing the threadable cap 30 to the hose 8 during use and storage of the system 10.

In the stored configuration, the measuring device 20 is generally secured to the threadable cap 30 by hanger 29 and the threadable cap 30 is threadably secured to the threaded opening of the tank (not shown). As the threadable cap 30 is removed from the threaded opening, the measuring device 30 is moved towards the operational configuration in an upright orientation and ready to receive the tank additive as desired. In both the operational and stored configurations, as illustrated in the embodiment of the hanger 29, the cup fastener 32 extends from the threadable cap 30 and is threadably secured to the centrally located cap receiver 21. Alternatively, the hanger 29 may utilize alternative securing means generally known. In the stored configuration, the measuring device 20 is stored in an upside down orientation with the threadable cap 30 being threadably secured to and at least partially covering the opening of the tank (not shown).

Figure 8:
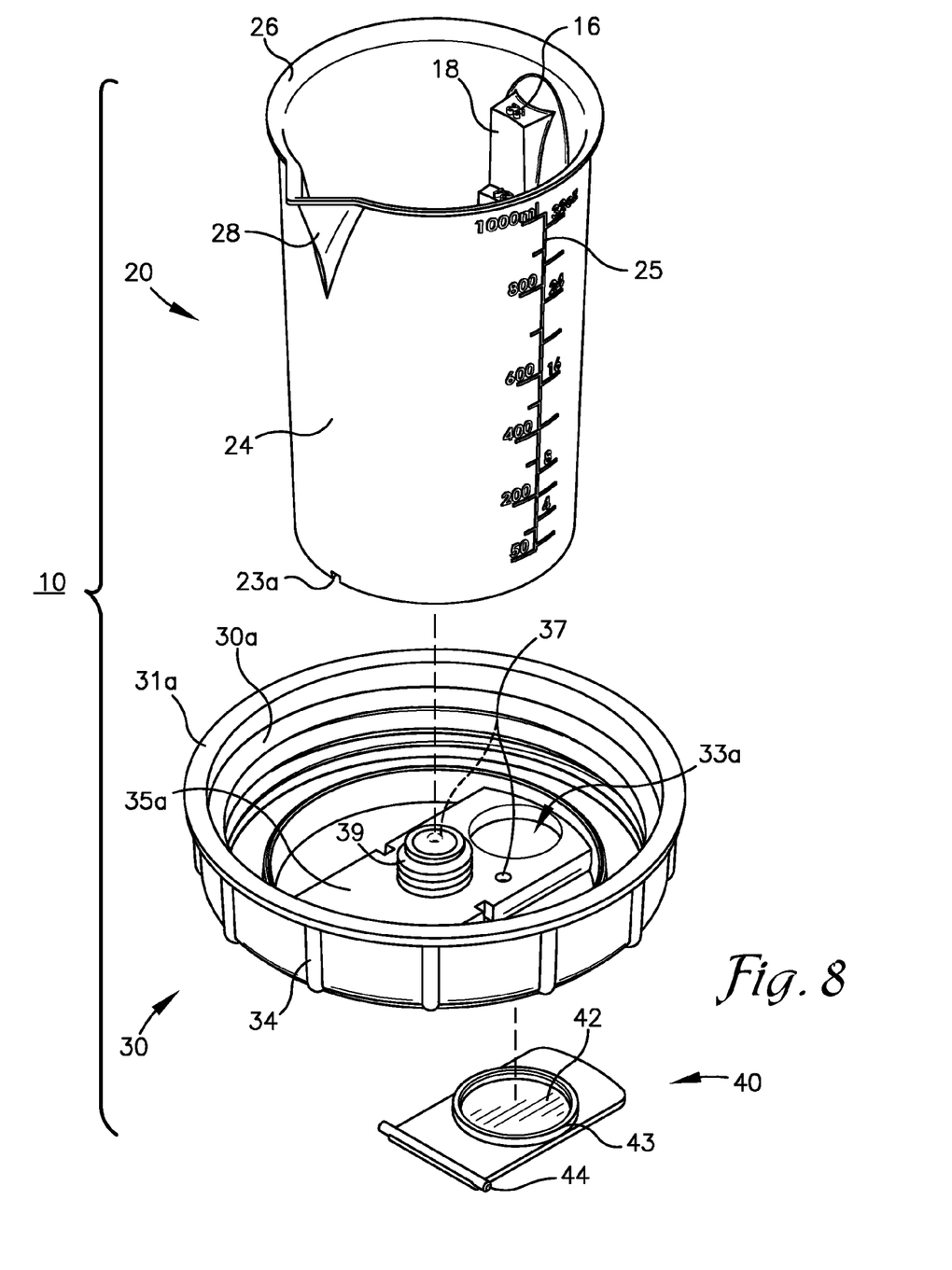
FIG. 8 is an exploded bottom view of the system.
Figure 9:
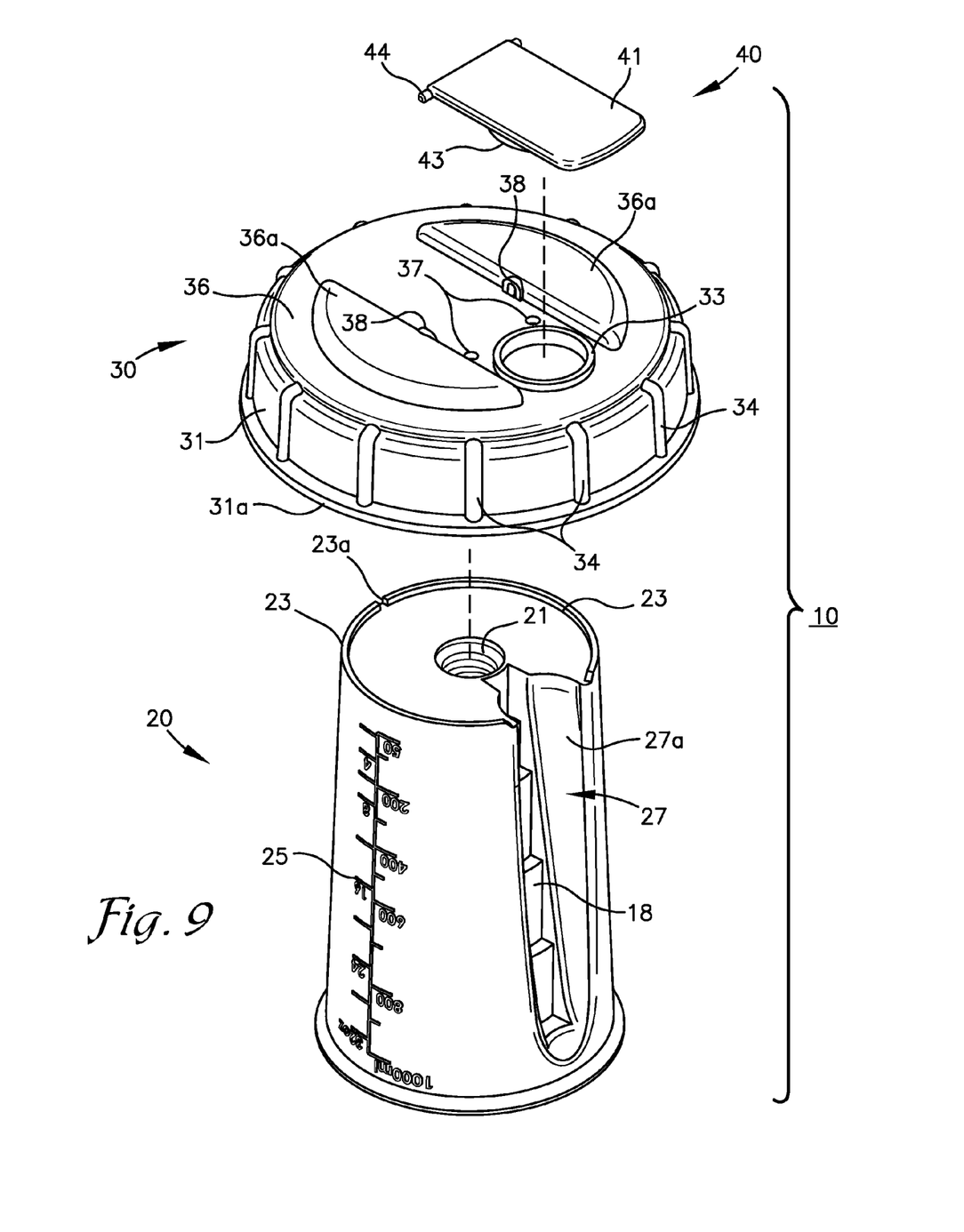
FIG. 9 is an exploded top view of the system.

FIGS. 8-9 illustrate an exploded view of the system 10 with the measuring device 20 separated from the threadable cap 30 and the hose restrictor 40. The arcuate passage 27 is further illustrated in FIG. 9 providing rearward access for the hose 8 as it extends through the hose testrictor 40 and the threadable cap 30 into the arcuate passage 27. As further illustrated in FIG. 9, the rear of the stepped structure 18 spans the cylindrical sidewall 24, presenting a hermetic sidewall for containing any contained additives. The illustrated embodiment of the stepped structure 18 guides the hose 8 outwardly and away from the measuring device 20 which may for example be towards the surrounding tank, for direct fluidic communication between the hose 8 and the tank (not shown) while the system 10 is threadable secured to the tank (not shown).

As illustrated in FIG. 2, the measuring device 20 is generally mechanically secured to the threadable cap 30 with the hanger 29. The centrally disposed, hanger 29 generally includes the cap receiver 21 associated with the measuring device 20 and the cup fastener 32 associated with the threadable cap 30, although other fasteners may be utilized including, mechanical, chemical or magnetic to join the measuring device 20 to the threadable cap 30. Alternatively, the measuring device 20 may be integrally formed through known molding or forming processes in fabrication of the threadable cap 30.

In the embodiment depicted in FIG. 9, the measuring device 20 includes an alignment member 23 depicted as a raised or beveled ring for guided receipt by a corresponding structure associated with the threadable cap 30. The alignment member 23 may include a guide 23a to help further align and secure the measuring device 20 with the threadable cap 30.

The arcuate passage 27 is located behind the stepped structure 18 which is adapted for releasable receipt of the typical garden hose 8. The arcuate passage 27 is illustrated as having a generally semicircular channel presented by a pair of arcuate members 27a separated by the outwardly extending rear side of the vertical and horizontal structure 18 positioned within the arcuate passage 27. The arcuate members 27a may be arranged to provide frictional resistance and to limit undesired movement of the hose 8 within the arcuate passage 27, including rotational, lateral and longitudinal movement which may be presented by the hose 8 as fluid moves through the hose 8, when the hose 8 becomes pressurized or when fluid exits one end. In such a way, a recoil force may be presented by the hose 8, which if unclamped would allow the hose 8 to free itself therefore potentially spilling, splattering or spraying fluid or chemical additives. In addition, the arcuate members 27a, in association with the arcuate passage 27, secure the hose 8 as the transmitted fluid presents an upward force on the hose 8. An alternative hose receiver embodiment (not shown) may mechanically connect the hose 8 to an alternative hose receiver (not shown) which allows for fastening of the hose 8 during transmission of fluid into the tank (not shown).

It is to be understood that while certain forms of the present invention have been illustrated and described herein, it is not to be limited to the specific forms or arrangement of parts described and shown.

What is claimed and desired to be secured by Letters Patent:

1. A system for receiving and dispensing a fluid into an agricultural tank with a threaded opening, said system comprising:
   a threadable cap having cap sidewall extending, between a cap base and a cap lip, said cap sidewall presenting a threaded member for threaded engagement with the agricultural tank as said cap lip is extending towards said agricultural tank, said threadable cap at least partially received by the threaded opening;
   a hose restrictor mounted to said cap base and pivotable from a closed position to an open position for passage of a hose through said base of said threadable cap for filling the agricultural tank with fluid from said hose;
   said threadable cap further comprising a retainer engagement ring and said hose restrictor having a cap engagement ring whereby said retainer engagement ring and said cap engagement ring are engaged while said hose restrictor is in said closed positions;
   an arcuate passage accessible through said threadable cap and cot figured for receipt of said hose as it passes through said threadable cap while the hose restrictor is in the open position;
   a measuring device for measuring a tank additive having a cylindrical sidewall extending between a circular bottom and a lip said cylindrical sidewall presenting a dispensing spout and a plurality of sidewall measuring indicia spaced therealong;
   a stepped measuring structure extending vertically along said cylindrical sidewall and presenting a plurality of raised measuring indicia whereby said sidewall measuring indicia and said raised measurina indicia measure said tank additive while in the operational configuration; and
   a hanger extending between and securing said threadable cap to said measuring device whereby said measuring device is secured upside down within the aariculturai tank during the stored configuration.

2. The system of claim 1 wherein said arcuate passage presents a pair of arcuate members separated by the stepped measuring structure said arcuate members receiving said hose whereby said hose is angled outwardly from said measuring device.

3. The system of claim 1 wherein said arcuate passage presents a pair of arcuate members for receiving said hose.

4. A system for receiving and dispensing a tank additive into an agricultural tank with a threaded opening, said system comprising:
   threadable cap having cap sidewall extending between a cap base and a cap lip, said cap sidewall presenting a threaded member for threaded engagement with the agricultural tank as said cap lip is extending towards said agricultural tank, said threadable cap at least partially received by the threaded opening;
   a measuring device for measuring the tank additive, said measuring device having a cylindrical sidewall extending between a circular bottom and a lip;
   a hanger extending between and securing said threadable cap to said measuring device whereby said measuring device is secured upside down within the agricultural tank during a stored configuration, said measuring, device being operable in an operational configuration with said threadable cap removed from the threaded opening;
   said cylindrical sidewall presenting a dispensing spout and a plurality of sidewall measuring indicia spaced therealong;
   a stepped measuring structure extending vertically along said cylindrical sidewall and presenting a plurality of raised measuring indicia whereby said sidewall measuring indicia and said raised measuring indicia measure said tank additive while said measuring device is in said operational configuration;
   a hose restrictor mounted to said cap base and pivotable from a closed position to an open position for passage of a hose through said base of said threadable cap;
   an arcuate passage which in combination with said stepped measuring structure receives said hose for filling the agricultural tank with fluid from said hose; and
   said threadable cap have a retainer engagement ring and said hose restrictor having a cap engagement ring whereby said retainer engagement ring and said cap engagement ring are engaged while said hose restrictor is in said closed position.

* * * * *